No. 879,676. PATENTED FEB. 18, 1908.
J. H. RYAN.
TIRE OF WHEELS.
APPLICATION FILED DEC. 14, 1907.
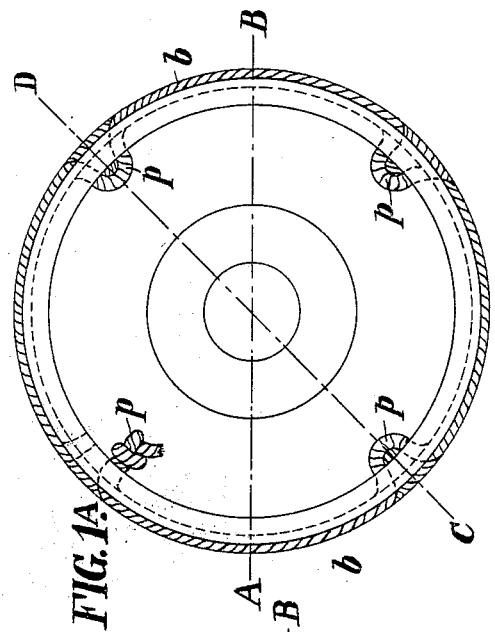
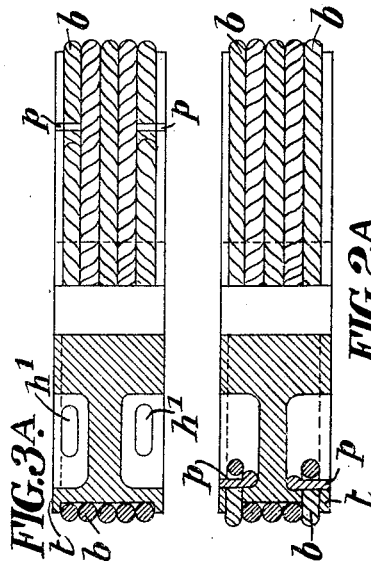
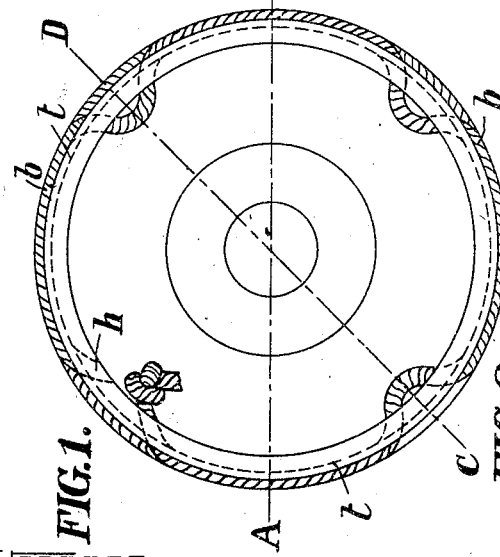
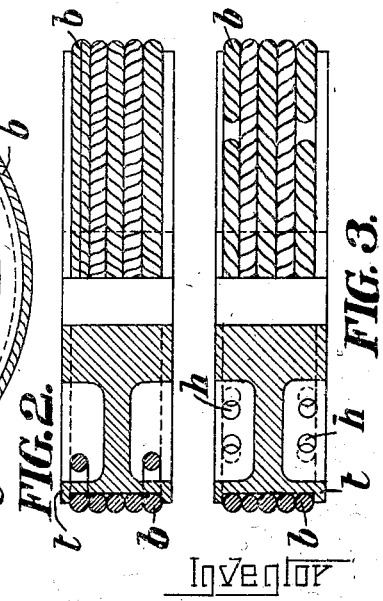
Witnesses
Mary W. Hanmer
Albert Popluna
Inventor
John Henry Ryan
By Sturtevant & Mason
Attorneys

UNITED STATES PATENT OFFICE.

JOHN H. RYAN, OF DUBLIN, IRELAND.

TIRE OF WHEELS.

No. 879,676.    Specification of Letters Patent.    Patented Feb. 18, 1908.

Application filed December 14, 1907. Serial No. 406,405.

*To all whom it may concern:*

Be it known that I, JOHN HENRY RYAN, subject of the King of Great Britain, residing at Dublin, in the county of Dublin, Ireland, civil engineer, have invented certain new and useful Improvements in Connection with Tires of Wheels, for which application has been made in Great Britain, No. 27,654, dated December 5, 1906, (pending application.)

This invention relates to vehicle wheel tires of the type in which a band of cord or rope of yarn, wire, wire rope, raw hide or other suitable material is used as a tire or as a protective band for an elastic tire, and consists in a method of attaching the said band to the felly or tire of the wheel; and in order that my invention may be readily understood, I will describe the same fully with reference to the accompanying drawings, in which, Figure 1 is a side view of a metal wheel provided with my improvement. Fig. 1^A is a similar view illustrating a different way of securing the protective band on the rim. Fig. 2 is a partial cross section and a partial end view of Fig. 1 on the line C D. Fig. 2^A is a partial cross section and a partial end view on the line C D of Fig. 1^A. Fig. 3 is a partial cross section and a partial end view of Fig. 1 on the line A B. Fig. 3^A is a partial cross section and partial end view on the line A B of Fig. 1^A.

In the practice of my invention, reference being made first to Figs. 1 to 3 inclusive. I drill or bore in pairs a number of holes $h$, obliquely through the rim or felly $t$ all round the circumference and preferably near the edge of such rim on both sides; I then pass a band $b$ of cord, rope, yarn, wire, wire rope, raw hide, leather or other suitable material through one or other of the holes $h$ and secure the end on the under side of the rim or felly $t$. I then pass the other end of the band $b$ and the band itself through the adjacent hole $h$ on the same side, and bring it back through the next hole $h$ adjoining and so on until it is threaded or laced through all the holes; the band is then wound around the periphery of the rim $t$, which may be flat, concave, convex, or fluted, in the same manner or is wound around in coils lying side by side until the whole width of the rim $t$ is covered to the corresponding set of holes on the opposite side of the rim $t$ and through which holes it is passed threaded or laced in a similar manner to that by which the first set were threaded or laced, the rope is then strained or pulled taut and the end is securely fastened by a knot, or any of the usual methods for fastening a loose end.

In the construction shown in Figs. 1^A, 2^A, 3^A and in lieu of the holes adjoining one another as in Figs. 1, 2, 3 I drill or bore a number of oblong holes $h'$ through the rim or felly $t$ all round the circumference, preferably but not necessarily near the edge of such rim on both sides; I then pass a band $b$ of cord, rope, yarn, wire, wire rope, leather or other suitable material through one of the holes $h'$ and secure the end as hereinbefore described; I then pass the other end of the said band $b$ and the band itself through the next hole $h'$ in a looped fashion, on the same side and maintain it in position by a pin or cotter $p$ of half round or other suitable form. I then bring it along the circumference of the rim to the next hole where it is secured in the same manner, and so on until it has been secured at all the holes, it is then wound around the periphery of the rim $t$ and completed substantially in the manner described with reference to Figs. 1 to 3.

It is apparent that the rope or band may be in one or more lengths, having two or more free ends.

It will be apparent that rims of wheels covered or tired in this manner may be applied and used on wheels already tired with metal or wherever a device such as rubber or other material is required to eliminate or diminish the noise caused by the action of wheels tired with metal or hard wood as also to impart a degree of resiliency in the tread or tire or cover of such wheels that it may be applied to, and also to add to the life of all such vehicles as use wheels tired in the manner aforesaid; and in the case of pneumatic tires or tubes a band of leather or other suitable material can be used as a protection to such pneumatic tubes and through and in or on which band the rope aforesaid can be fixed in the manner already described for metal tires under Figs. 1 to 3 and Figs. 1^A to 3^A which will tend to prevent side slipping.

I declare that what I claim is:—

1. In a wheel, a rim having a series of holes extending around the periphery thereof adjacent the edge, and a protective covering for said rim composed of flexible material wound around said rim and passing alternately into and out of said holes, and means for securing said covering in position.

2. In a wheel, a rim having a series of holes arranged in pairs and extending around the periphery of said rim adjacent the edge, and a protective covering for said rim composed of a cord or band laced through said openings on both sides with means for securing the free ends.

3. In a wheel, a rim having a series of holes arranged in pairs and extending around the periphery of said rim adjacent the edge, and a protective covering for said rim composed of a cord or band laced through said openings on both sides, cotter pins passed through the loops extending into said openings, and means for securing the free ends.

In witness whereof, I have hereunto signed my name this 3rd day of December 1907, in the presence of two subscribing witnesses.

J. H. RYAN.

Witnesses:
WM. F. NEFF,
A. B. BLACK.